US009542540B2

(12) United States Patent
Hotes et al.

(10) Patent No.: US 9,542,540 B2
(45) Date of Patent: Jan. 10, 2017

(54) SYSTEM AND METHOD FOR MANAGING APPLICATION PROGRAM ACCESS TO A PROTECTED RESOURCE RESIDING ON A MOBILE DEVICE

(71) Applicant: WaveMarket, Inc., Emeryville, CA (US)

(72) Inventors: Scott Hotes, Berkeley, CA (US); Tasos Roumeliotis, Orinda, CA (US); David Blackston, New York, NY (US)

(73) Assignee: Location Labs, Inc., Emeryville, CA (US)

( * ) Notice: Subject to any disclaimer, the term of this patent is extended or adjusted under 35 U.S.C. 154(b) by 0 days.

(21) Appl. No.: 14/613,874

(22) Filed: Feb. 4, 2015

(65) Prior Publication Data
US 2015/0154389 A1 Jun. 4, 2015

Related U.S. Application Data

(62) Division of application No. 12/728,174, filed on Mar. 19, 2010, now abandoned.
(Continued)

(51) Int. Cl.
*G06F 21/00* (2013.01)
*G06F 21/31* (2013.01)
(Continued)

(52) U.S. Cl.
CPC .............. *G06F 21/31* (2013.01); *G06F 9/468* (2013.01); *G06F 21/6218* (2013.01);
(Continued)

(58) Field of Classification Search
CPC ................. G06F 21/31; G06F 21/6245; G06F 2221/2141; G06F 21/51
(Continued)

(56) References Cited

U.S. PATENT DOCUMENTS 6,138,003 A   10/2000 Kingdon et al.
6,594,483 B2   7/2003 Nykanen et al.
(Continued)

OTHER PUBLICATIONS

Tobias Vejda, Ronald Toegl, Martin Pirker, and Thomas Winkler;Towards Trust Services for Language-Based Virtual Machines for Grid Computing; Graz University of Technology, Inffeldgasse 16a, A-8010 Graz, Austria.
(Continued)

*Primary Examiner* — Syed Zaidi
(74) *Attorney, Agent, or Firm* — Dovas Law, P.C.

(57) ABSTRACT

A computer-implemented method for managing application program access to a protected resource residing on a mobile device is provided. The method includes receiving from an application program a request for a permission to access the protected resource, and receiving from a source external to the mobile device an authentication of the application program. An authorization to provide the permission to access the protected resource is received and permission to access the protected resource is provided to the application program in response to receiving the authorization. Data produced by the protected resource is cryptographically signed, and a notification is generated in response to at least one of the application program requesting the permission to access the protected resource and the application program accessing the protected resource. A system for managing application program access to a protected resource residing on a mobile device is further provided.

10 Claims, 4 Drawing Sheets

Related U.S. Application Data

(60) Provisional application No. 61/161,879, filed on Mar. 20, 2009.

(51) Int. Cl.
*G06F 9/46* (2006.01)
*G06F 21/62* (2013.01)
*H04L 9/32* (2006.01)
*H04W 12/08* (2009.01)

(52) U.S. Cl.
CPC ........ *G06F 21/6245* (2013.01); *H04L 9/3213* (2013.01); *H04L 9/3271* (2013.01); *H04W 12/08* (2013.01); *G06F 2221/2115* (2013.01)

(58) Field of Classification Search
USPC .......................................................... 726/4
See application file for complete search history.

(56) References Cited

U.S. PATENT DOCUMENTS

| | | | |
|---|---|---|---|
| 6,961,855 B1 | 11/2005 | Rich et al. | |
| 6,963,748 B2 | 11/2005 | Chithambaram et al. | |
| 7,054,648 B2 | 5/2006 | Abtin et al. | |
| 7,096,029 B1 | 8/2006 | Parupudi et al. | |
| 7,145,898 B1 | 12/2006 | Elliott | |
| 7,190,960 B2 | 3/2007 | Wilson et al. | |
| 7,210,121 B2 | 4/2007 | Xia et al. | |
| 7,213,048 B1 | 5/2007 | Parapudi et al. | |
| 7,221,947 B2 | 5/2007 | Casey | |
| 7,224,987 B1 | 5/2007 | Bhela et al. | |
| 7,333,820 B2 | 2/2008 | Sheha et al. | |
| 7,461,385 B2 | 12/2008 | Winter | |
| 7,536,437 B2 | 5/2009 | Zmolek | |
| 7,784,087 B2 | 8/2010 | Yami et al. | |
| 7,995,756 B1 | 8/2011 | McKinney et al. | |
| 8,683,554 B2 | 3/2014 | Martin et al. | |
| 8,818,412 B2 | 8/2014 | Hotes et al. | |
| 2002/0016173 A1 | 2/2002 | Hunzinger | |
| 2002/0035556 A1 | 3/2002 | Shah et al. | |
| 2002/0177449 A1 | 11/2002 | McDonnell et al. | |
| 2003/0035544 A1 | 2/2003 | Herle et al. | |
| 2003/0051169 A1 | 3/2003 | Sprigg et al. | |
| 2003/0060214 A1 | 3/2003 | Hendrey et al. | |
| 2003/0200465 A1* | 10/2003 | Bhat .................. H04L 63/0815 726/8 |
| 2004/0025022 A1 | 2/2004 | Yach et al. | |
| 2004/0143457 A1 | 7/2004 | Demirian et al. | |
| 2004/0166832 A1 | 8/2004 | Portman et al. | |
| 2004/0198374 A1 | 10/2004 | Bajikar | |
| 2004/0266457 A1 | 12/2004 | Dupray | |
| 2005/0010780 A1 | 1/2005 | Kane et al. | |
| 2005/0048948 A1 | 3/2005 | Holland et al. | |
| 2005/0282557 A1 | 12/2005 | Mikko | |
| 2006/0135177 A1 | 6/2006 | Winterbottom et al. | |
| 2006/0137007 A1 | 6/2006 | Paatero et al. | |
| 2006/0167816 A1 | 7/2006 | Wang et al. | |
| 2006/0189328 A1 | 8/2006 | Cedervall et al. | |
| 2007/0060171 A1 | 3/2007 | Sudit et al. | |
| 2007/0100981 A1* | 5/2007 | Adamczyk .............. H04L 69/18 709/223 |
| 2007/0105565 A1 | 5/2007 | Enzmann et al. | |
| 2007/9136202 | 6/2007 | Noma et al. | |
| 2007/0287473 A1 | 12/2007 | Dupray | |
| 2008/0004043 A1 | 1/2008 | Wilson et al. | |
| 2008/0113671 A1 | 5/2008 | Ghozati et al. | |
| 2008/0299989 A1 | 12/2008 | King et al. | |
| 2009/0046677 A1 | 2/2009 | Toledano et al. | |
| 2009/0047972 A1 | 2/2009 | Neeraj | |
| 2009/0138198 A1 | 5/2009 | Lee et al. | |
| 2009/0157693 A1 | 6/2009 | Palahnuk | |
| 2010/0162370 A1 | 6/2010 | Altay et al. | |
| 2010/0242097 A1 | 9/2010 | Hotes et al. | |
| 2010/0242098 A1 | 9/2010 | Kenworthy | |
| 2010/0251340 A1 | 9/2010 | Martin et al. | |
| 2011/0022834 A1 | 1/2011 | Rahman et al. | |
| 2011/0137817 A1 | 6/2011 | Roumeliotis et al. | |

OTHER PUBLICATIONS

Press Release, Veriplace Launch, Apr. 1, 2008, Wavemarket, Inc.
Veriplace Developer Guide, Apr. 1, 2008, Wavemarket, Inc.
Office Action dated Jan. 18, 2013 for U.S. Appl. No. 12/689,769.
Office Action dated Jun. 22, 2012 for U.S. Appl. No. 12/689,769.
Office Action dated Oct. 7, 2011 for U.S. Appl. No. 12/406,825.
Office Action dated Jun. 1, 2012 for U.S. Appl. No. 12/406,825.
Office Action dated Jun. 29, 2012 for U.S. Appl. No. 12/728,174.
Office Action dated Sep. 14, 2012 for U.S. Appl. No. 12/728,174.
Office Action dated Jul. 3, 2012 for U.S. Appl. No. 12/728,174.
Office Action dated Nov. 5, 2012 for U.S. Appl. No. 12/728,174.
Office Action dated Jul. 20, 2012 for U.S. Appl. No. 12/791,854.
Office Action dated Dec. 16, 2013 for U.S. Appl. No. 12/791,854.
Office Action dated Jun. 5, 2014 for U.S. Appl. No. 12/791,854.
Office Action dated May 6, 2013 for U.S. Appl. No. 12/791,854.
Coombs, Jason "Win32 API Obscurity for 1/0 Blocking and Intrusion Prevention", Jun. 2005.
Office Action dated Jun. 24, 2015 for U.S. Appl. No. 12/791,854.
Office Action dated Jan. 28, 2015 for U.S. Appl. No. 12/791,854.
Office Action dated Sep. 2, 2016 for U.S. Appl. No. 12/791,854.

* cited by examiner

SYSTEM AND METHOD FOR MANAGING APPLICATION PROGRAM ACCESS TO A PROTECTED RESOURCE RESIDING ON A MOBILE DEVICE

CROSS REFERENCE TO RELATED APPLICATION(S)

This application is a division of U.S. patent application Ser. No. 12/728,174, filed Mar. 19, 2010, which claims the benefit of U.S. Provisional Application No. 61/161,879, filed Mar. 20, 2009, which applications are incorporated by reference as if fully set forth.

BACKGROUND

As telecommunication carriers continue to invest in location infrastructure, a proliferation of location-based services is developing ranging from consumer services such as local search and mobile social networking to enterprise services such as fleet management and asset tracking.

The location of a mobile device is typically considered a high-value asset. Accordingly, it would be desirable to protect the process of initiating a location fix of a mobile device, receiving the location details, and disseminating this information. This process typically begins with accessing an API within the device execution environment or operating system, which in turn accesses hardware location determining resources on the device. Hardware location determining resources typically include a dedicated chipset, for example a dedicated GPS/A-GPS chipset, or a part of a multi-function chipset.

Further, it would be desirable to protect other resources available on a mobile device. A data store including contents of user's address book, contents of a user's contact list, or contents of a user's electronic message inbox, such an SMS or MMS inbox, for example, are often considered private or confidential by a user and necessary to be protected from unauthorized access.

SUMMARY

The invention provides a computer-implemented method for managing application program access to a protected resource residing on a mobile device. The method includes receiving from an application program a request for a permission to access the protected resource, and receiving from a source external to the mobile device an authentication of the application program. An authorization to provide the permission to access the protected resource is received and permission to access the protected resource is provided to the application program in response to receiving the authorization.

The invention further provides a computer-implemented method for managing application program access to a protected resource residing on a mobile device, wherein the method includes providing the mobile device with a module separating an application program interface (API) layer for enabling an application program from a protected resource layer, comprising the protected resource, on the mobile device. A remote server remote to the mobile device is configured for connection to the mobile device via a network. The secure resource module receives from the application program via the API layer a request for a permission to access the protected resource. An authentication is transmitted with the remote server to the mobile device. The module receives from the remote server the authentication of the application program. The module receives from at least one of the remote server and a user an authorization to provide the permission for the application program to access the protected resource. The module provides to the application program the permission to access the protected resource in response to receiving the authorization.

The invention further provides a system for managing application program access to a protected resource residing on a mobile device comprising at least one computing device including at least one memory comprising instructions operable to enable the computing device to perform a procedure. The procedure includes receiving from an application program a request for a permission to access the protected resource, and receiving from a source external to the mobile device an authentication of the application program. An authorization to provide the permission to access the protected resource is received and permission to access the protected resource is provided to the application program in response to receiving the authorization.

The invention further provides computer-readable media tangibly embodying a program of instructions executable by a computing device to implement a method, the computing device being capable of interfacing with a communications network. The method includes receiving from an application program a request for a permission to access the protected resource, and receiving from a source external to the mobile device an authentication of the application program. An authorization to provide the permission to access the protected resource is received and permission to access the protected resource is provided to the application program in response to receiving the authorization.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1:
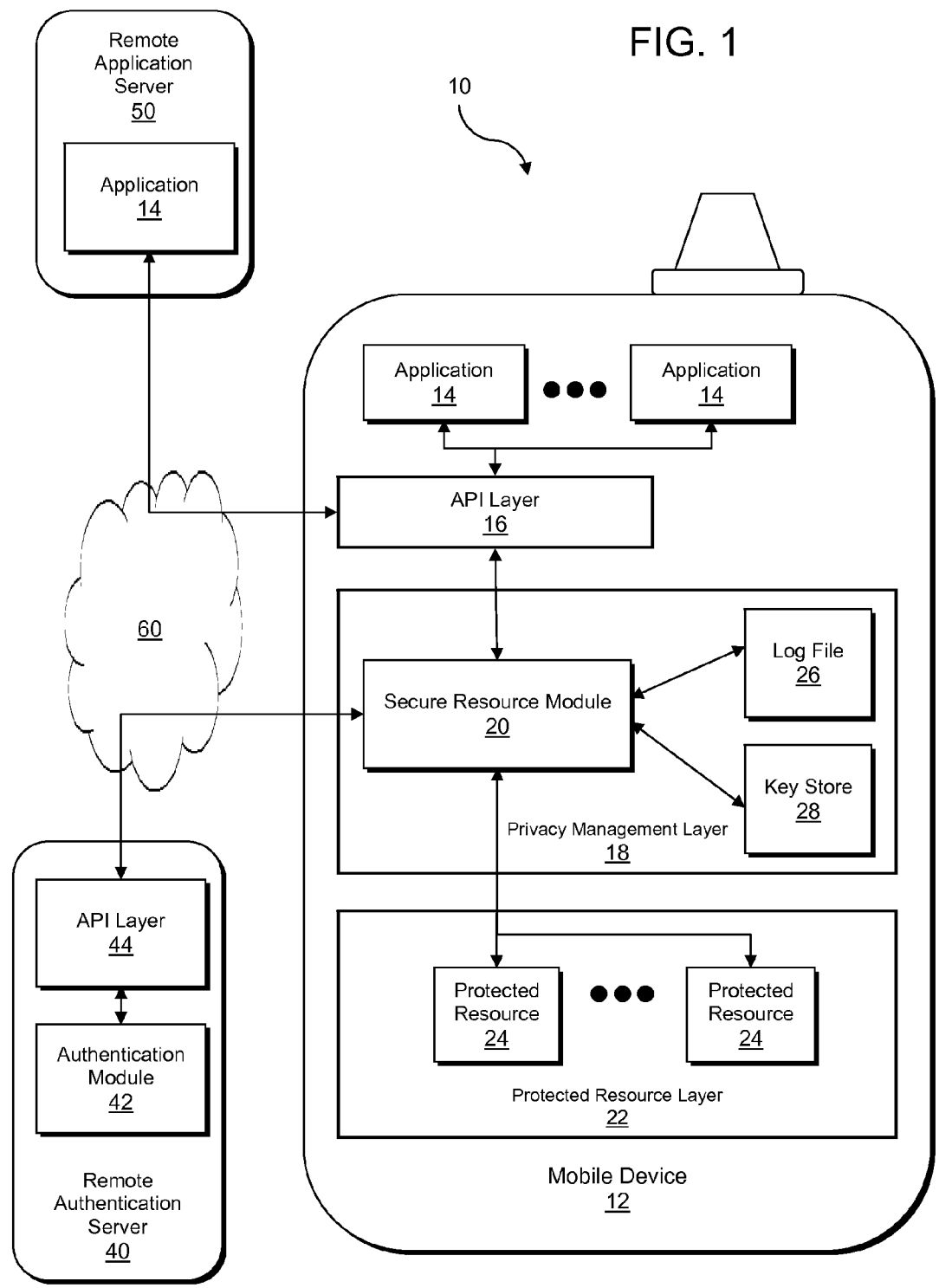
FIG. 1 is a schematic illustration of an exemplary operating environment in which a system for managing application program access to a protected resource residing on a mobile device according to a preferred embodiment of the invention is operable.

The preferred embodiments of the present invention are described below with reference to the drawing figures in which like numerals represent like elements throughout.

Referring to FIG. 1, a schematic illustration of an exemplary operating environment 10 is shown in which a mobile device 12 operates. The mobile device 12 includes a preferred system in the form of a secure resource module 20 for managing access of application programs 14 to one or more protected resources 24 residing on the mobile device 12. The mobile device 12 includes one or more computing devices and one or more memory devices, which computing devices and memory devices may be integrally constructed or connected in any suitable manner. The mobile device 12 provides a platform which enables an application program interface (API) layer 16, a privacy management layer, and a protected resource layer 22. The secure resource module 20, a secure log file 26, and a secure key store 28 are preferably incorporated in the privacy management layer 18. One or more protected resources 24 are preferably incorporated in the protected resource layer 22. The privacy management layer 18 is preferably a dedicated layer within the firmware or hardware of the mobile device 12. The protected resource layer 22 is preferably another dedicated layer within the firmware or hardware of the mobile device 20. The privacy management layer 18 is preferably configured to perform at least two important functions. First, access to a protected resource 24 results in the generation of a notification, and second, access to a protected resource 24 is controlled via the secure resource module 20.

The protected resources 24 include resources which generate or store information which can be deemed personal or private by a user, a telecommunication carrier, or other interested party. In a preferred embodiment, a protected resource 24 can include a resource for producing location data. Such a location resource can include a dedicated GPS location determining chipset or a multi-function chipset enabled for GPS location determination installed on the mobile device 12. Alternatively, a protected resource 24 can include a data store including contents of user's address book, contents of a user's contact list, or contents of a user's electronic message inbox, such an SMS or MMS inbox. Alternatively, the protected resource can include any resource deemed personal or private.

The secure resource module 20 can be installed on the mobile device 12 as one or more of a software, firmware or hardware module during manufacturer of the mobile device 12. Alternatively, the secure resource module 20 can be installed and or upgraded by a user as one or more of a software, firmware or hardware module, for example as a software or firmware module transmitted via a network accessible server such as a remote authentication server 40 over the Internet 60. The secure resource module 20 separates the API layer 16 from the protected resource layer 22. The secure resource module 20 can be configured for interface with one or both of a local resident application program 14 and a remote network-accessible application program 14 executed by a remote application server 50 via the API layer 16. Alternatively, the secure resource module 20 can be configured for interface with application program logic within the operating system of the mobile device 12.

The secure resource module 20 is configured to receive from an application program 14 via the API layer 16 a request for a permission to access the protected resource 24. The secure resource module 20 is preferably configured to receive an authentication of the application program 14 from a source external to the mobile device 12. Preferably, a remote authentication server 40 is provided for authenticating the application program 14. The remote authentication server 40 includes an authentication module 42 for performing authentication of the application program 14 and an API layer 44 which provides an interface between the secure resource module 20 and the authentication module 42. The authentication is preferably transmitted in the form of a cryptographically secure request token by the remote authentication server 40. The request token is received by the secure resource module 20 via an API functioning out of the API Layer 44 enabled by the remote authentication server 40.

The secure resource module 20 is further configured to receive an authorization to provide a permission to access the protected resource 24. The authorization is preferably cryptographically secure and digitally signed. The secure resource module 20 can receive the authorization in the form of a cryptographically secure digitally signed request, wherein the secure resource module 20 verifies the cryptographically secure digitally signed request. The authorization is preferably transmitted by the remote authentication server 40 and received by the secure resource module 20 via an API functioning out of the API Layer 44 enabled by the remote authentication server 40 in the form of a cryptographically secure access token. The authorization can be transmitted as a response to a password or other authenticating data entered or otherwise provided through the mobile device 12 by a user via the secure resource module 20, and transmitted to the authentication module 42 via the API Layer 44 enabled by the remote authentication server 40.

The secure resource module 20 is configured to provide the application program 14 the permission to access the protected resource 24 in response to receiving the authorization. The secure resource module 20 is further configured to sign data produced by the protected resource 24 to assure authenticity of the data provided to and used by the application program 14. The mobile device 12 is preferably provided with a cryptographically secure key store 28 enabled by the privacy management layer 18. The secure resource module 20 accesses the cryptographically secure key store 28 to obtain a key for cryptographically signing data produced by the protected resource 24.

The secure resource module 20 is configured to generate a notification in response to one or both of the application program 14 requesting the permission to access the protected resource 24 and the application program 14 accessing the protected resource 24. The notification informs a user of the mobile device 12 or a remote user monitoring the activity of the mobile device 12 when an application program 14 requests access to a protected resource 24 on the mobile device 12, or alternatively, when the application program 14 actually accesses the protected resource 24. The notification can be provided with a user-query to permit a user to provide an authorization or a portion of an authorization to provide a permission to the application program 14 to access the protected resource 24. Alternatively, the notification can merely notify the user of the request for permission to access the protected resource 24 or the actual access, as in a case where the authorization was provided solely by another source such as the remote authentication server 40, or as in a case where the authorization was previously provided by the user. The secure resource module 20 can transmit the notification in the form of one or more of a Short Message Service (SMS), a Multimedia Messaging Service (MMS), and an electronic mail. A cryptographically secure log file 26 is preferably provided enabled by the privacy management layer 18. The secure module 20 can further transmit the notification in the form of an addition to the cryptographically secure log file 26 stored on the mobile device 12.

Figure 2:
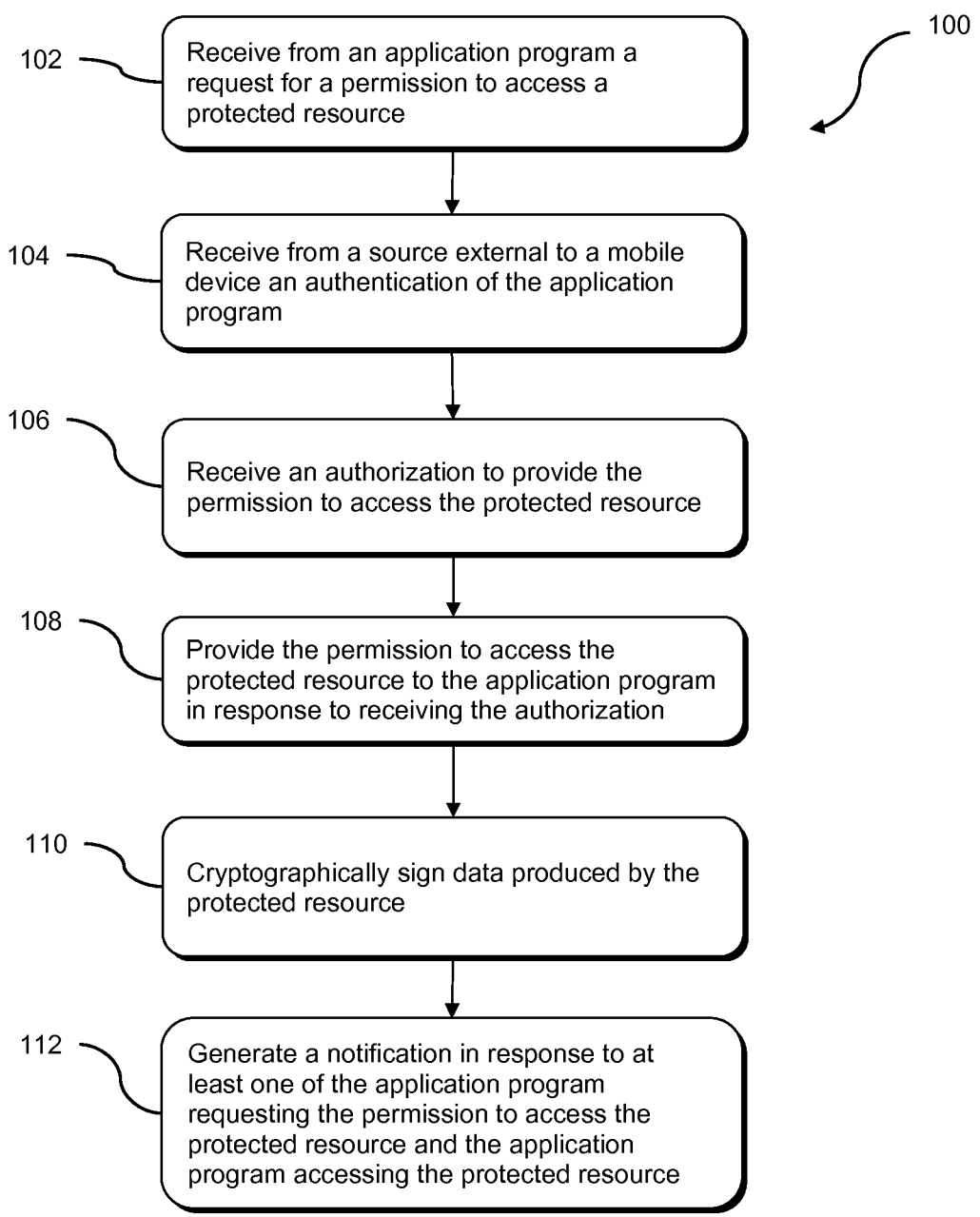
FIG. 2 is a flow chart showing a computer-implemented method for managing application program access to a protected resource residing on a mobile device according to a preferred embodiment of the invention.

Referring to FIG. 2, a computer-implemented method 100 for managing application program access to a protected resource residing on a mobile device is shown. The process 100 is preferably performed via the secure resource module

20 of FIG. 1. The process 100 may alternatively be performed via any suitable system. In the process 100, a request for a permission to access a protected resource is received from an application program (step 102). An authentication of the application program is received from a source external to the mobile device (step 104). An authorization to provide the permission to access the protected resource is received (step 106). Permission to access the protected resource is provided to the application program in response to receiving the authorization (step 108), and data produced by the protected resource is cryptographically signed (step 110). A notification is generated in response to at least one of the application program requesting the permission to access the protected resource and the application program accessing the protected resource (step 112).

The authentication module 42 is preferably configured to establish a user account using identifying information of a user. The remote authentication server 40 is configured to receive the identifying information through the API layer 44 from the mobile device 12 via the secure resource module 20, via a network connection, which network connection is preferably an Internet network connection 60. The identifying information preferably includes at least the name of the user, a telephone number associated with a user's mobile device, and a telecommunication carrier identifier associated with the user's mobile device used to establish a connection with the telecommunication carrier. The API layer 44 preferably provides an interface through a client application running on the mobile device 12, which client application is preferably a web client, WAP client, Java ME™ client, BREW™ client, SMS client or other suitable client. The remote authentication server 40 associates a user identifier, which is preferably randomly generated, with the user account. The remote authentication server 40 is preferably configured to receive from an executed application program 14 via the secure resource module 20 through the API layer 44 a request for the user identifier of the user.

The remote authentication server 40 is configured to receive via the API layer 44 an identifier request authorization, which, depending on the application program 14 and the preference of the user, is received from either user input or automatically from the application program 14 via the secure resource module 20. In the case where authorization is provided automatically via the application program 14, the identifier request authorization is preferably provided in the form of an element of known personal information from the user including but not limited to one or more of an email address, a physical address, and a telephone number associated with the mobile device 12. The remote authentication server 40 is configured to provide via the API layer 44 the user identifier to the application program 14 via the secure resource module 20 in response to receiving the identifier request authorization.

The remote authentication server 40 is preferably configured to receive from the secure resource module 20 through the API layer 44 a request for an authorization to provide an application program 14 permission to access the protected resource 24 of the user mobile device 12 associated with the pre-determined user identifier. Prior to providing the authorization to provide permission to access the protected resource 24, an authorization is preferably received by the remote authentication server 40 from a user via the mobile device 12 or other suitable client. The authorization of the user can take the form of a password, a digitally signed request, or other secure authorization protocol. The remote authentication server 40 is configured to provide the authorization to provide permission to access the protected resource 24 to the secure resource module 20 in response to receiving such authorization from the user, or alternatively, other suitable source. Preferably, if an authorization is not provided by a user or other source, no authorization to provide permission to access the protected resource 24 is provided by the remote authentication server 40 to the secure resource module 20. Depending on preference of the user, the authorization can be provided to the secure resource module 20 from the remote authentication server 40 as an authorization to provide permission to access the mobile device information one time, a predetermined number of times, for a specified time interval, until the authorization is revoked, or until any predetermined condition is met. The authorization is preferably received by the secure resource module 20 via the API layer 44 of the remote authentication server 40.

Figure 3:
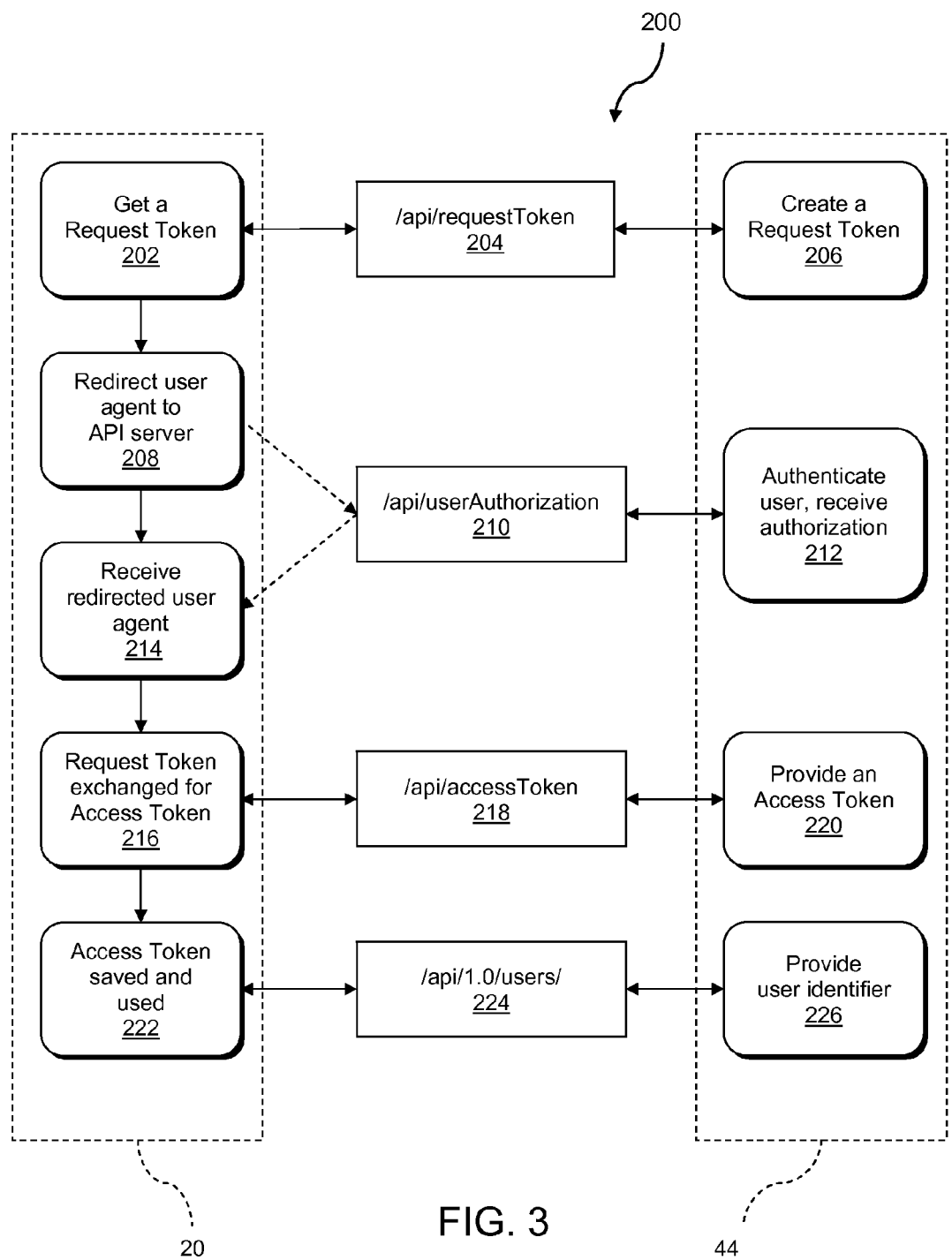
FIG. 3 is a workflow diagram showing interactions of an authorization procedure between a remote authentication server application program interface (API) layer and a secure resource module according to a preferred embodiment of the invention.

Referring to FIG. 3, a workflow 200 of an authorization procedure for providing a user identifier implemented by the secure resource module 20 and the remote authentication server 40 via the authentication module 42 and the API layer 44 according to a preferred embodiment of the present invention is shown. The application program 14 via the secure resource module 20 directs a request for a request token (step 202) through a request token URL 204 provided by the authentication module 42 via the API layer 44. The remote authentication server 40, via the authentication module 42, creates a request token (step 206) which is provided to the secure resource module 20 in response to the application program's request. If required by a user or a user's telecommunication carrier, or if necessitated by a particular application, a user agent is redirected by the secure resource module 20 to the remote authentication server 40 (step 208) through a user authorization URL 210 provided via the API layer 44 which implements a suitable web interface or other interface to permit the user to enter a required authorization. The remote authentication server 40, via the API layer 44 preferably authenticates the user, shows the user the user's privacy settings, receives the identifier request authorization from the user, and redirects the user agent back to the secure resource module 20 (step 212). The secure resource module 20 receives the redirected user agent (step 214) and provides the request token, as associated with the identifier request authorization from the user, to the remote authentication server 40 through an access token URL 218 provided by the authentication module 42 (step 216). The remote authentication server 40 provides an access token to the secure resource module 20 in exchange for receiving the authorized request token (step 220). The secure resource module 20 saves the access token and presents the access token to the remote authentication server 40 (step 222) through an identity URL 224, and the remote authentication server 40 provides the user identifier to the application program 14 via the secure resource module 20 in response to receiving the access token (step 226). The access token is preferably revoked immediately or within a predetermined time period after the user identifier is provided to the third party application program. The secure resource module 20 is preferably configured to securely store the request and access tokens such that they are not directly accessible by the application program 14.

In the case where user authorization is not required as a prerequisite for providing the user identifier to the third party application program, for example in instances where a user has already provided identifying information to the application program 14, steps 202, 206, 208, 212, 214, 216 and 220 are omitted. In such case, the application program 14 via the secure resource module 20 preferably provides an application-specific access token in the step 222 which includes identifying information previously provided to the application program 14 by the user in order to retrieve the user's user identifier. Alternatively, in cases where a user identifier is not applicable, the authorization procedure shown by the workflow 200 can be omitted entirely.

Figure 4:
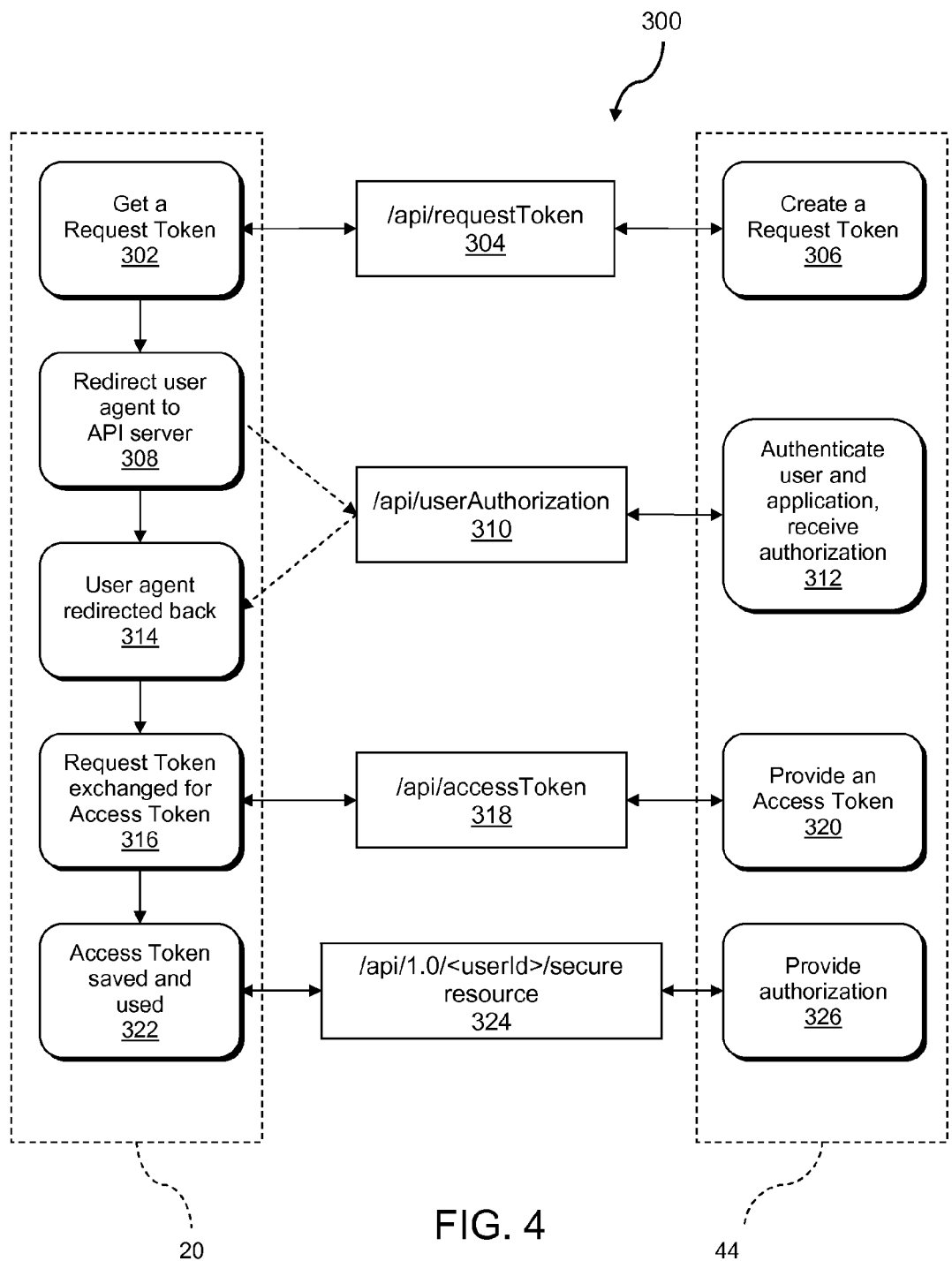
FIG. 4 is a workflow diagram showing interactions of an authorization procedure between a remote authentication server application program interface (API) layer and a secure resource module according to a preferred embodiment of the invention.

Referring to FIG. 4, a workflow 300 of an authorization procedure for authorizing access to a protected resource 24, implemented by the secure resource module 20 and the remote authentication server 40 via the authentication module 42 and the API layer 44 according to a preferred embodiment of the present invention is shown. The application program 14 via the secure resource module 20 directs a request for a request token (step 302), including the user identifier if a user identifier is applicable, through a request token URL 304 provided by the authentication module 42 via the API layer 44. The remote authentication server 40, via the authentication module 42 creates a request token (step 306) which is provided to the secure resource module 20 in response to the application program's request. If a user authorization is required, the user agent is redirected by the secure resource module 20 to the remote authentication server 40 (step 308) through a user authorization URL 310 provided via the API layer 44 which implements a suitable web interface or other consent user interface (UI) to permit the user to enter required authorization. The remote authentication server 40, via the authentication module 42 and the API layer 44 preferably authenticates the user and the application program, shows the user the user's privacy settings, receives the protected resource authorization from the user, and redirects the user agent back to the secure resource module (step 312). Alternatively, the application program can be authenticated without authenticating a user, and further, the application program can be authenticated without a user authorization and redirection of a user agent. The secure resource module 20 receives the redirected user agent (step 314) and provides the request token to the remote authentication server 40 through an access token URL 318 provided by the authentication module 42 via the API layer 44 (step 316). The remote authentication server 40 provides an access token to the secure resource module 20 in exchange for receiving the authorized request token (step 320). The secure resource module 20 saves the access token and presents the access token to the remote authentication server 40 (step 322) through a secure resource URL 324. The remote authentication server 40 provides the secure resource module 20 the authorization to provide a permission to the application program 14 to access the protected resource 24 in response to receiving the access token (step 326). The access token is preferably revoked immediately or within a predetermined time period after the authorization to provide permission to the application program 14 to access the protected resource 24 is provided. The secure resource module 20 is preferably configured to securely store the request and access tokens such that they are not directly accessible by the application program 14.

In communicating with the remote authentication server 40, the secure resource module 20 is preferably configured to use the access token to check for existing authorizations, and the remote authentication server 40 is preferably configured to notify the secure resource module 20 of the existing authorizations, from prior user authorizations stored by the remote authentication server 40. If there are no existing authorizations, the secure resource module 20 preferably prompts a user for authorization. If existing authorizations exist, the secure resource module 20 preferably updates the authorization status including the authorization access history stored on the remote authentication server 40. The secure resource module 20 is preferably configured to use the access token to manage authorizations on the remote authentication server 40 for a particular combination of user and application program 14. The secure resource module 20 can be additionally configured to use the access token in a process of submitting data generated and stored on the user mobile device to the remote authentication server 40.

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A computer-implemented method for managing application program access to a protected resource residing on a mobile device, the method performed by at least one network-connectable server, the method comprising:
    associating a user identifier with a user account corresponding to identifying information of a user corresponding to the mobile device;
    receiving from an application residing on the mobile device via a network a request for the user identifier of the user via a module residing on the mobile device, the module separating an application program interface (API) layer for enabling the application from a protected resource layer comprising the protected resource on the mobile device;
    receiving from the user by redirection of a user agent by the module an identifier request authorization to provide the user identifier to the application;
    redirecting the user agent back to the module;
    providing the user identifier to the application via the module in response to receiving the identifier request authorization;
    receiving a request via the module for an authorization to provide the application permission to access a protected resource of the particular mobile device associated with the user identifier;
    receiving via the mobile device a resource access authorization from the user to transmit the authorization to provide the application permission to access the protected resource of the particular mobile device; and
    providing the authorization via the module to provide the application permission to access the protected resource of the particular mobile device responsive to receiving the resource access authorization from the user.

2. The computer-implemented method of claim 1, further comprising establishing the user account by receiving identifying information of the user comprising at least one of the name of the user, a telephone number associated with the mobile device, or a telecommunication carrier identifier associated with the mobile device.

3. The computer-implemented method of claim 1, further comprising receiving the identifier request authorization in the form of at least one of an email address, a physical address, or a telephone number associated with the mobile device.

4. The computer-implemented method of claim 1, further comprising:
    receiving the resource access authorization from the user by another redirection of the user agent; and
    again redirecting the user agent back to the module.

5. A computer-implemented method for managing application program access to a protected resource residing on a mobile device, the method performed by at least one network-connectable server, the method comprising:

associating a user identifier with a user account corresponding to identifying information of a user corresponding to the mobile device;

receiving from an application residing on the mobile device through a network a request for a user identifier via a module residing on the mobile device, the module separating an application program interface (API) layer for enabling the application from a protected resource layer comprising the protected resource on the mobile device;

providing a request token to the module residing on the mobile device;

receiving from at least one of the user or the application via the module an identifier request authorization to provide the user identifier to the application;

associating the user identifier request authorization with the request token to authorize the request token;

receiving the authorized request token from the module;

providing an access token to the module in response to receiving the authorized request token from the module;

receiving the access token from the module; and providing the user identifier to the application in response to receiving the access token from the module;

receiving a request for an authorization to provide the application permission to access a protected resource of the mobile device associated with the user identifier;

receiving via the mobile device a resource access authorization from the user to transmit the authorization to provide the application permission to access the protected resource of the mobile device; and providing the authorization to provide the application permission to access the protected resource of the mobile device responsive to receiving the resource access authorization from the user.

6. The computer-implemented method of claim 5, further comprising:

receiving the identifier request authorization from the user by redirection of a user agent; and redirecting the user agent back to the module.

7. The computer-implemented method of claim 5, further comprising:

providing an additional request token to the remote application server in response to receiving the user identifier;

receiving the resource access authorization from the user by redirection of a user agent;

redirecting the user agent back to the module;

associating the resource access authorization from the user with the additional request token to authorize the additional request token;

receiving the authorized additional request token from the module;

providing an additional access token to the module in response to receiving the authorized additional request token;

receiving the additional access token from the module; and providing the module the authorization to provide the application permission to access the protected resource in response to receiving the additional access token.

8. A computer-implemented method for managing application program access to a protected resource residing on a mobile device, the method performed by at least one network-connectable server, the method comprising:

associating a user identifier with a user account corresponding to identifying information of a user corresponding to the mobile device;

receiving through a network from an application residing on the mobile device a request for the user identifier of the user via a module residing on the mobile device, the module separating an application program interface (API) layer for enabling the application from a protected resource layer comprising the protected resource on the mobile device;

receiving from at least one of the user or the application an identifier request authorization to provide the user identifier to the application;

providing the user identifier to the application via the module;

receiving from the application via the module a token request including the user identifier;

providing a request token to the module in response to receiving the user identifier;

receiving a resource access authorization from the user by redirection of a user agent;

redirecting the user agent back to the module;

associating the resource access authorization from the user with the request token to authorize the request token;

receiving the authorized request token from the module;

providing an access token to the module in response to receiving the authorized request token;

receiving the access token from the module; and providing the module an authorization to provide the application permission to access the protected resource in response to receiving the access token.

9. A computer-implemented method for managing application program access to a protected resource residing on a mobile device, the method performed by at least one network-connectable server, the method comprising:

associating a user identifier with a user account corresponding to identifying information of a user corresponding to the mobile device;

receiving from an application residing on the mobile device through a network a request for a user identifier via a module residing on the mobile device, the module separating an application program interface (API) layer for enabling the application from a protected resource layer comprising the protected resource on the mobile device;

providing a first request token to the module residing on the mobile device;

receiving from at least one of the user or the application via the module an identifier request authorization to provide the user identifier to the application;

associating the user identifier request authorization with the first request token to authorize the first request token;

receiving the authorized first request token from the module;

providing a first access token to the module in response to receiving the authorized first request token from the module;

receiving the first access token from the module;

providing the user identifier to the application in response to receiving the first access token from the module;

receiving from the application via the module a request for authorization to provide the application permission to access the protected resource, the request including the user identifier;

providing a second request token to the module in response to receiving the user identifier;
receiving a resource access authorization from the user by redirection of a user agent;
redirecting the user agent back to the module;
associating the resource access authorization from the user with the second request token to authorize the second request token;
receiving the authorized second request token from the module;
providing a second access token to the module in response to receiving the authorized second request token;
receiving the second access token from the module; and
providing the module the authorization to provide the application permission to access the protected resource in response to receiving the second access token.

10. A computer-implemented method for managing application program access to a protected resource residing on a mobile device, the method performed by at least one network-connectable server, the method comprising:
associating a user identifier with a user account corresponding to identifying information of a user corresponding to the mobile device;
receiving from an application residing on the mobile device via a network a request for the user identifier of the user via a module residing on the mobile device, the module separating an application program interface (API) layer for enabling the application from a protected resource layer comprising the protected resource on the mobile device;
receiving from at least one of the user and the application an identifier request authorization to provide the user identifier to the application;
providing the user identifier to the application via the module in response to receiving the identifier request authorization;
receiving a request via the module for an authorization to provide the application permission to access a protected resource of the particular mobile device associated with the user identifier;
receiving via the mobile device by redirection of a user agent by the module a resource access authorization from the user to transmit the authorization to provide the application permission to access the protected resource of the particular mobile device;
redirecting the user agent back to the module; and
providing the authorization via the module to provide the application permission to access the protected resource of the particular mobile device responsive to receiving the resource access authorization from the user.

* * * * *